Jan. 17, 1956     H. H. MORSE     2,730,897
FUEL SYSTEM TESTER
Filed April 13, 1953     2 Sheets-Sheet 2
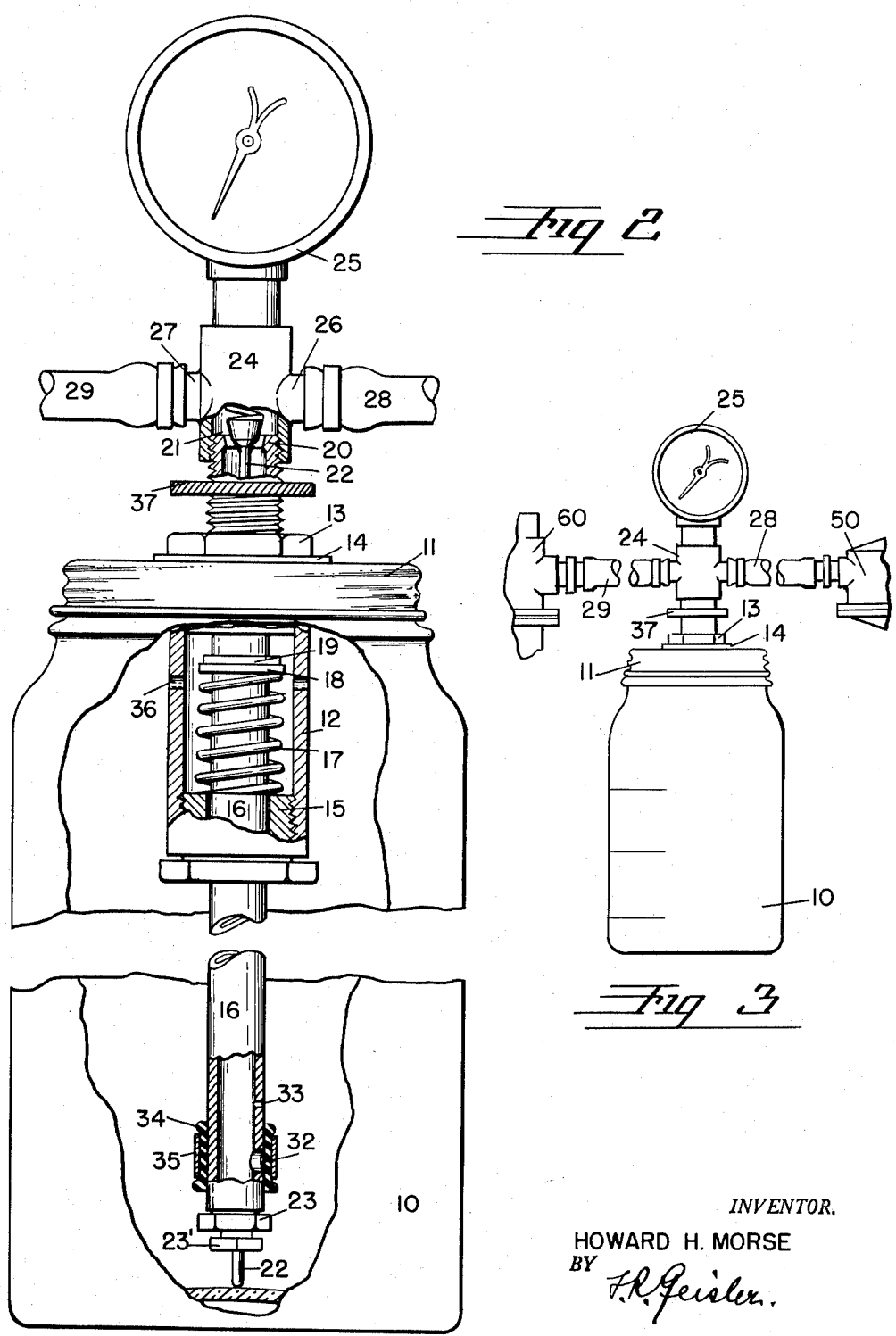
INVENTOR.
HOWARD H. MORSE
BY
ATTORNEY

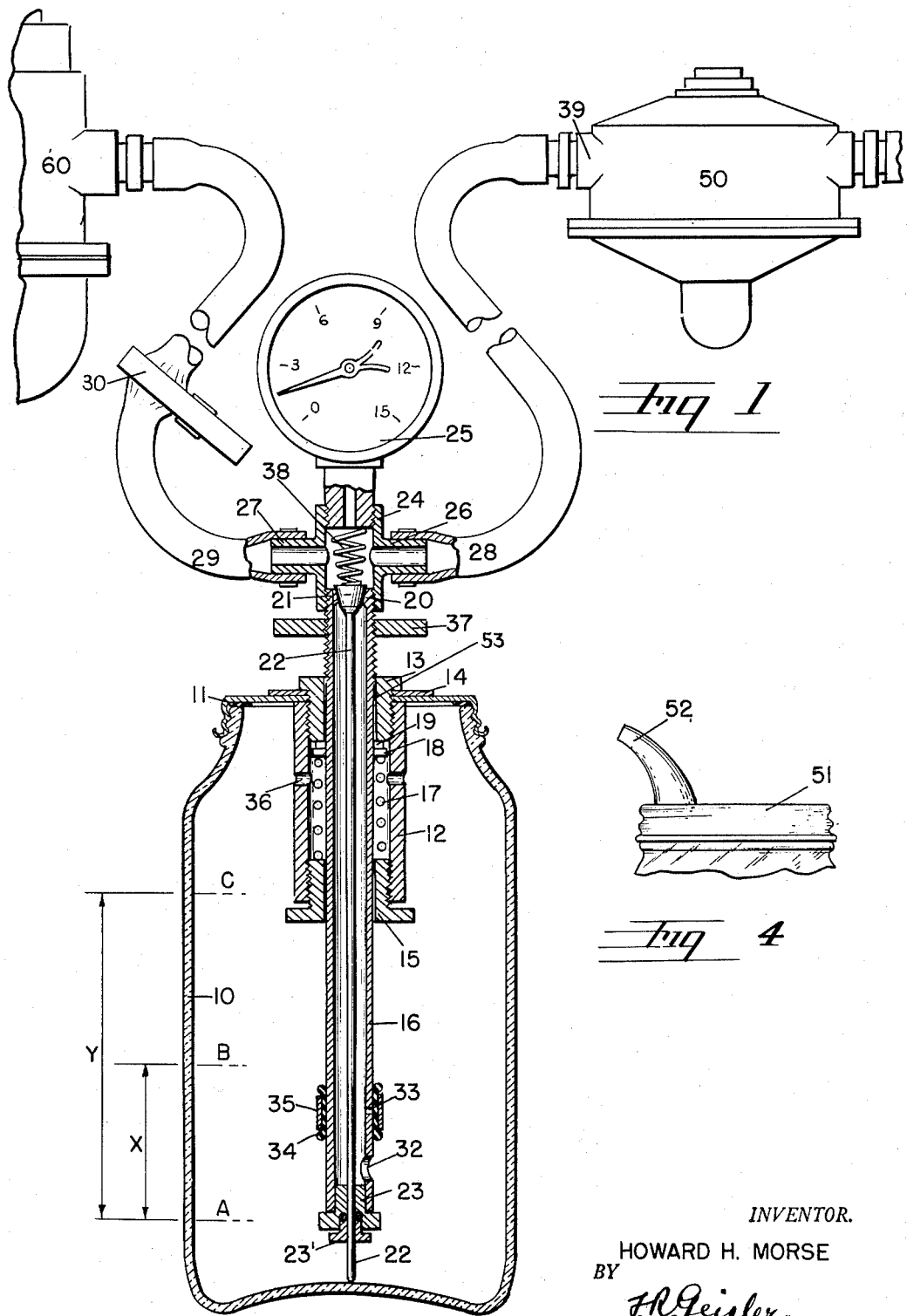

United States Patent Office 2,730,897
Patented Jan. 17, 1956

2,730,897

FUEL SYSTEM TESTER

Howard H. Morse, Portland, Oreg.

Application April 13, 1953, Serial No. 348,392

7 Claims. (Cl. 73—118)

This invention relates to the testing of the pump and related portions of a fuel system by which liquid motor fuel is caused to be delivered to the motor, particularly in an automotive vehicle.

A satisfactory testing of such fuel system requires not only the usual testing of the pump itself, to check the pressure and rate of delivery of the fuel from the pump, but requires also the ascertaining of any possible leakage in the system, such as leakage in the carburetor needle and seat, leakage at the pump and its valves, and also leakage of air into the suction side of the pump, that is to say, leakage of air into the fuel line between the fuel storage tank and the pump.

While several devices have been developed for testing the performance of fuel pumps in automotive vehicles, I have found that those which are most commonly used have no means for properly ascertaining whether any leak exists in the fuel line from the fuel tank to the pump. Since such a condition results in air being sucked into the fuel line instead of producing any leakage of fuel from the fuel line, an air leak in the line leading from the tank to the pump may exist for a considerable time without being detected, while the presence of air in the fuel as received by the pump results in reduced pump efficiency and causes early failure of the fuel pump itself.

Another objection to many devices which I have observed and which are designed for testing the fuel pump system in automotive vehicles is that the devices are complicated in construction, more or less expensive and are troublesome to use. As a consequence owners or operators of automotive vehicles often neglect having a needed thorough testing of the fuel delivery system made.

An object of the present invention is to provide an improved testing device for the fuel supply system in automotive vehicles and the like which, in addition to testing the performance of the fuel pump, can also be used to detect leaks and partial stoppage in the fuel system.

A related specific object of the invention is to provide such a testing device by which the general location of a leak in the fuel system, whether in the curburetor needle and seat, pump, or in the fuel line leading to the pump, can be quickly ascertained.

Another object of the invention is to provide a fuel system tester by which the performance of the fuel pump can be tested under varied pressure conditions if so desired.

An important further object of the invention is to provide an improved apparatus for testing the fuel delivery system in an automotive vehicle and the like which will be extremely simple in construction, inexpensive to manufacture, and so convenient and easy to use that a complete test of the fuel system can be made with a minimum expenditure of time and labor.

The manner in which these objects and other incidental advantages are attained with my fuel tester, and the construction and operation of the device, will be readily understood from the following brief description of the same with reference to the accompanying drawings.

In the drawings:

Fig. 1 is a sectional elevation of my device illustrating the same connected to the fuel pump and carburetor in an automotive vehicle in the operation of testing fuel pump pressure and also so arranged as to test leakage either in the fuel pump or in the carburetor;

Fig. 2 is a fragmentary elevation of my testing device, drawn to a slightly larger scale, with portions broken away and shown in section for the sake of clarity, and illustrating the operation of the device when volume flow tests of the pump are being made together with a test for leakage in the fuel line to the pump;

Fig. 3 is an elevation of my entire device drawn to a much smaller scale; and

Fig. 4 is a perspective view of the substitute cap for use on the fuel receptacle of my device when the test is completed and the fuel collected during the test is to be returned to the fuel supply tank of the vehicle.

My device includes a fuel receptacle 10, which is preferably in the form of a glass jar, or a jar of any other transparent material, and which may be either circular or square in cross section. The neck of the jar 10 is circular and is threaded on the outside so that a metal cap 11 can be tightly mounted thereon when the device is to be used.

The cap 11 has a central opening below which a cylindrical housing 12 extends. The upper end of the housing 12 (Fig. 1) is threaded on the inside for engagement with a threaded fitting 13 by which the housing 12 is tightly secured to the cap 11. A suitable washer 14 is interposed between the flange of the fitting 13 and the top face of the cap 11 to make a tight connection.

The housing 12 is also threaded on the inside at the bottom end to accommodate a flanged bushing 15 which has the same internal diameter as the fitting 13. A tube 16 has a sliding fit within the bushing 15 and fitting 13 and extends up above the cap 11. A spring 17, surrounding the tube 16 in the housing 12, has its lower end in engagement with the bushing 15 and its upper end in engagement with an annular flange 18 of the tube 16. Thus the spring 17 normally holds the tube 16 in the position illustrated in Fig. 1 when the device is set up, but allows the tube 16 to be manually pushed downwardly a limited distance with respect to the cap 11 and jar 10 for a purpose to be presently explained. A resilient washer 19 is carried on the tube 16 above the flange 18 to provide a substantially leak-proof connection between the tube 16 and fitting 13 while the tube remains in raised position. The fitting 13 has slotted air vents 53 extending longitudinally along its inner cylindrical surface, and the housing 12 has one or more air vents 36. Thus when the tube 16 is pushed downwardly moving the flange 18 and washer 19 away from the bottom end of the fitting 13, air can escape from the jar 10.

The upper end of the tube 16 is formed into a valve seat 20 for a valve 21. A valve rod 22 extends downwardly through the center of the tube 16 and beyond the bottom of the tube 16, passing through a bushing 23 and sealing element 23' in the lower end of the tube 16. As shown in Fig. 1, the bottom of the tube 16 is spaced above the bottom of the jar 10 but the rod 22 extends substantially to the bottom of the jar. Thus, as apparent from Fig. 1, a downward thrust on the tube 16 will lower the valve seat 20 with respect to the valve 21 and open the valve 21, the valve being shown in open position in Fig. 2.

A housing 24 is mounted on the top of the tube 16 and the housing 24 in turn supports a pressure gauge 25 of standard construction having a channel connecting with the interior of the housing 24. A spring 38 in the housing 24 holds the valve 21 normally in closed position. The housing 24 is formed with identical, oppositely-positioned, inlet and outlet extensions 26 and 27 respectively on which the ends of flexible tubes 28 and 29 are secured respectively, these flexible tubes 28 and 29 being formed of rubber, neoprene, or any other suitable resilient and flexible material. The channels or inlet and outlet extensions 26 and 27 in the housing 24 have approximately the same diameter as the minimum diameter of the valve seat 20. A clamp 30 is mounted on one of the flexible tubes 28 or 29, thus for example on the tube 29, to enable the channel in such tube to be closed when desired for the purpose later explained.

A pair of outlet ports 32 and 33 are located near the bottom end of the tube 16. One of these outlets, thus the outlet 32, as shown in Figs. 1 and 2, has a diameter approximately equal to the minimum diameter of the valve seat 20. The other outlet 33 is of much smaller diameter and the size of the orifice outlet can be selected to represent flow through any specified size carburetor needle and seat orifice. A sleeve 34 of flexible material suitable for forming a seal, is slidably carried on the tube 16 and is adapted to close off either of the outlet ports 32 or 33 as desired. Preferably a spring metal clamp 35 is provided on the sleeve 34 to insure proper closure of the particular outlet port over which the sleeve is placed.

In the testing operation the device is set up as illustrated in Fig. 1. The flexible tube 28, leading to the inlet 26 of the housing 24, is connected to the pressure side 39 of the fuel pump 50. The other flexible tube 29 is connected to the carburetor 60. With the valve 21 closed (and thus with the tube 16 in normal raised position) the engine and pump are operated and the pressure on the gauge 25 noted. The engine and pump are then stopped and the gauge observed.

Should the gauge pressure drop completely, this would indicate a leak either at the carburetor or at the pump. To determine in which of these two locations the leak exists, the engine and pump are again operated to bring the gauge reading up to the preceding reading. Then the engine and pump are stopped and the clamp 30 on the flexible tube 29 is manipulated to close the tube 29. If the gauge pressure again drops completely this will indicate that the leak in question is in the pump with which the other tube 28 is connected. Should such a drop not occur then this fact will indicate that the leak in question must be in the carburetor. (Obviously this method of ascertaining the location of the leak could be followed whether the clamp 30 is placed on the tube 29 or on the tube 28 and it is optional which tube is closed during such test.)

Assuming that there is no leak either in the pump or in the carburetor, the next step in the testing of the fuel system would be to determine the pump performance. For this purpose the sleeve 34 on the tube 16 is preferably in the raised position illustrated in Fig. 1 and thus the small outlet port 33 is sealed while the large outlet port 32 is opened. The engine and pump are again started and the housing 24 and tube 16 are pushed downwardly with respect to the jar 10, against the force of spring 17 and also against the force of spring 38. This causes the valve 21 to be fully opened and permits the fuel delivered to the housing 24 to pass down through the tube 16 and out through the port 32 into the jar 10.

The wall of the jar 10 is marked with a bottom ring A (Fig. 1). On one side of the jar higher line marks B and C are also indicated, one line B being for a small pump and the upper line C for a large pump. The ring mark A is the starting level for the flow test. With the engine and pump running and the valve 21 fully open, fuel is delivered into the jar 10 and as soon as the fuel has reached the level A, the timing of the flow volume is started. The mark B is so positioned above A that the volume AB, indicated by the line $x$ in Fig. 1, is the amount of flow which should occur in a given period of time, thus in 45 seconds, in a small pump operated at 500 engine R. P. M. Likewise the mark C is so positioned that the volume AC indicated by the line $y$ in Fig. 1, will be the amount of flow which should occur from a large pump during the same period of time at the same engine R. P. M. Other sides of the jar 10 can, if desired, be furnished with further markings for particular types of pumps. Thus the rate of delivery from the pump is quickly determined in this manner. Should the maximum volume of the flow be less than that set up as a standard by the manufacturer of the fuel pump, the cause of this smaller volume will be due to— a. A faulty fuel pump,
b. An air leak in the line leading from the fuel supply tank, or
c. A restriction or partial stoppage in the fuel supply line to the pump probably in the flexible portion of this supply line.

Since the walls of the receptacle or jar 10 are transparent and since the fuel passing into the jar is delivered near the bottom of the jar, the presence of any air in the delivered fuel will result in bubbles passing from the outlet of the tube 16 to the surface of the fuel in the jar 10. The presence of air in the delivered fuel would mean that air is being drawn into the pump as the fuel is drawn from the storage tank and this would indicate a leak in the fuel line between storage tank and pump. This while the volume rate of flow from the pump is being checked the possibility of a leak in the fuel line to the pump can also be ascertained. Vapor as well as air in the fuel would produce bubbles in the jar 10, but since vapor bubbles would be so much smaller in size than air bubbles the latter can easily be distinguished from probable vapor bubbles. In addition to testing volume of maximum flow from the pump a flow test under restricted flow is desirable. By lowering the sleeve 34 on the tube 16 until the larger outlet port 32 is sealed and the smaller orifice outlet port 33 opened, a flow test under known orifice size can be made with the valve 21 fully opened. This test is made in the same manner as the maximum flow test previously described. However, for this purpose additional markings are placed on the jar 10 for the pump of each particular manufacturer. This test with a restricted orifice outlet enables the pump being tested to deliver a volume of fuel in the 45 seconds interval of time at 500 engine R. P. M. However, due to the restricting orifice outlet the fuel pump must deliver against a pressure. The test will thus determine whether or not the intake valves of the fuel pump are faulty. If these intake valves leak or do not seal properly a low volume of delivery through the restricting orifice will be the result. This condition would not become evident if only the maximum volume flow test were made.

As a further means for enabling flow tests under varying pressures to be made, should such tests be desired, I provide an adjustable screw collar 37 on the tube 16 above the jar 10 located between the fitting 13 and the housing 24. This adjustable collar 37 has threaded engagement with threads on the outside of the tube 16 and its distance above the top of the fitting 13 can be adjusted by rotating the collar. This collar, when moved down close to the top of the fitting 13, will limit the extent to which the tube can be lowered, and in other words, the collar 37 can be made to limit the extent to which the valve 21 is opened. It is possible with the use of caliper markings on the top of the collar 37 and cooperating marking on the tube 16, to provide for a definite restricted opening of the valve 21. With such a restricted opening of the valve 21, instead of having the valve in fully opened position as previously described, and with the outlet port 32 of the tube open, a flow test under any predetermined pressure as indicated by the pressure gauge may be made.

When all the testing is completed, the cap 11 is unscrewed from the jar 10 and the fuel which has collected in the jar is poured back into the fuel storage tank (not shown). To facilitate the pouring of the fuel from the jar 10, I have found it also convenient to provide the substitute cap 51, shown in Fig. 4, which can be quickly screwed on the jar 10 and which has a convenient pouring spout 52.

Several minor modifications would be possible in my improved fuel system tester within the scope of the invention, and it is not my intention to limit the same otherwise than as set forth in the appended claims.

I claim:

1. In an apparatus for testing a fuel pump and fuel system, a housing having an inlet port and an outlet port, a conduit having one end connected to said inlet port and the other end adapted to be connected to the pressure side of the fuel pump, a second conduit having one end connected to said outlet port and the other end adapted to be connected to the carburetor in the fuel system, a pressure gauge connected with said housing, a test receptacle for fuel, said receptacle having a transparent wall and having markings on said wall, a tube extending into said receptacle and terminating near the bottom of said receptacle, a bottom closure for said tube, the other end of said tube connected to said housing, a valve at the upper end of said tube enabling fuel to be passed through said tube into said receptacle when said valve is opened and shutting off the passage of fuel through said tube when said valve is closed, a pair of outlet orifices of different size arranged at different levels in the lower portion of said tube, and a sleeve slidable on said tube and adapted to close either of said orifices selectively, the smaller of said orifices being sufficiently small in size to restrict the discharge of fuel into said receptacle from said tube and said housing when said valve is fully open.

2. In an apparatus for testing a fuel pump and fuel system, a housing having an inlet port and an outlet port, a conduit having one end connected to said inlet port and the other end adapted to be connected to the pressure side of the fuel pump, a second conduit having one end connected to said outlet port and the other end adapted to be connected to the carburetor in the fuel system, a pressure gauge on said housing, a test receptacle for fuel, said receptacle having a transparent wall and having markings on said wall, a tube extending into said receptacle and terminating a spaced distance from the bottom of said receptacle, a bottom closure for said tube, a cap mounted on said receptacle, said tube extending through said cap, supporting means for said tube carried by said cap, a spring element included in said supporting means, whereby said tube may be thrust downwardly a limited distance against the force of said spring, the upper end of said tube connected to said housing, a valve controlling the passage of fuel through said tube into said receptacle, a seat for said valve, a valve rod for said valve extending down through said tube and through said bottom closure and slidable therein, said rod terminating adjacent the bottom of said receptacle, a spring element normally holding said valve closed, whereby downward movement of said tube with respect to said receptacle will result in the raising of said valve from said valve seat, and an outlet orifice in the lower portion of said tube.

3. In an apparatus for testing a fuel pump and fuel system, a housing having an inlet port and an outlet port, a conduit having one end connected to said inlet port and the other end adapted to be connected to the pressure side of the fuel pump, a second conduit having one end connected to said outlet port and the other end adapted to be connected to the carburetor in the fuel system, a pressure gauge on said housing, a test receptacle for fuel, said receptacle formed of transparent material, a tube extending into said receptacle and terminating a spaced distance from the bottom of said receptacle, a bottom closure for said tube, a cap removably mounted on said receptacle, said tube extending through said cap, supporting means for said tube carried by said cap, a spring element included in said supporting means, whereby said tube may be thrust downwardly a limited distance against the force of said spring, said housing mounted on the upper end of said tube above said cap, a valve at the upper end of said tube controlling the passage of fuel from said housing through said tube into said receptacle, a seat for said valve, a valve rod for said valve extending down through said tube and through said bottom closure and slidable therein, said rod terminating adjacent the bottom of said receptacle, a spring element normally holding said valve closed, whereby downward movement of said tube with respect to said receptacle will result in the raising of said valve from said valve seat, and an outlet orifice in the lower portion of said tube.

4. An apparatus for testing a fuel pump and fuel system including a housing having an inlet port and an outlet port, a conduit having one end connected to said inlet port and the other end adapted to be connected to the pressure side of the fuel pump, a second conduit having one end connected to said outlet port and the other end adapted to be connected to the carburetor in the fuel system, a pressure gauge on said housing, a test receptacle for fuel, said receptacle having a transparent wall, a tube extending into said receptacle and terminating a spaced distance from the bottom of said receptacle, a bottom closure for said tube, a cap removably mounted on said receptacle, said tube extending through said cap, supporting means for said tube carried by said cap, a spring element included in said supporting means, whereby said tube may be thrust downwardly a limited distance against the force of said spring, the upper end of said tube connected to said housing, a valve at the upper end of said tube controlling the passage of fuel through said tube into said receptacle, a seat for said valve, a valve rod for said valve extending down through said tube and through said bottom closure and slidable therein, said rod terminating adjacent the bottom of said receptacle, a spring element normally holding said valve closed, whereby downward movement of said tube with respect to said receptacle will result in the raising of said valve from said valve seal, a pair of outlet orifices of different size arranged at different levels in the lower portion of said tube, and a sleeve slidable on said tube and adapted to close either of said orifices selectively, the smaller of said orifices being sufficiently small in size to restrict the discharge of fuel into said receptacle from said tube and said housing when said valve is fully open.

5. An apparatus for testing a fuel pump and fuel system including a housing having an inlet port and an outlet port, a conduit having one end connected to said inlet port and the other end adapted to be connected to the pressure side of the fuel pump, a second conduit having one end connected to said outlet port and the other end adapted to be connected to the carburetor in the fuel system, a pressure gauge on said housing, a test receptacle for fuel, said receptacle having a transparent wall, a tube extending into said receptacle and terminating a spaced distance from the bottom of said receptacle, a bottom closure for said tube, a cap mounted on said recetapcle, said tube extending through said cap, supporting means for said tube carried by said cap, a spring element included in said supporting means, whereby said tube may be thrust downwardly a limited distance against the force of said spring, said housing mounted on the upper end of said tube above said cap, a valve at the upper end of said tube controlling the passage of fuel from said housing through said tube into said receptacle, a seat for said valve, a valve rod for said valve extending down through said tube and through said bottom closure and slidable therein, said rod terminating adjacent the bottom of said receptacle, a spring element normally holding said valve closed, whereby downward movement of said tube with respect to said receptacle will result in the raising of said valve from said valve seat, an outlet orifice in the lower portion of said tube, and an adjustable collar on said tube above said receptacle cap for limiting the downward movement of said tube with respect to said receptacle and thereby limiting the extent to which said valve may be opened.

6. An apparatus for testing a fuel pump and fuel system comprising a housing having an inlet port and an outlet port, a flexible conduit having one end connected to said inlet port and the other end adapted to be connected to the pressure side of the fuel pump, a second flexible conduit having one end connected to said outlet port and the other end adapted to be connected to the carburetor in the fuel system, means for closing the passageway through one of said conduits, a pressure gauge connected with said housing, a test receptacle for fuel, said receptacle having a transparent wall and having markings on said wall, a tube extending into said receptacle and terminating a spaced distance from the bottom of said receptacle, a bottom closure for said tube, a cap removably mounted on said receptacle, said tube extending through said cap, supporting means for said tube carried by said cap, a spring element included in said supporting means, whereby said tube may be thrust downwardly a limited distance against the force of said spring, the upper end of said tube connected to said housing, a valve at the upper end of said tube controlling the passage of fuel through said tube into said receptacle, a seat for said valve, a valve rod for said valve extending down through said tube and through said bottom closure and slidable therein, said rod terminating adjacent the bottom of said receptacle, a spring element normally holding said valve closed, whereby downward movement of said tube with respect to said receptacle will result in the raising of said valve from said valve seat, an outlet orifice in the lower portion of said tube, and an adjustable collar on said tube above said receptacle cap for limiting the downward movement of said tube with respect to said receptacle and thereby limiting the extent to which said valve may be opened.

7. An apparatus for testing a fuel pump and fuel system comprising a housing having an inlet port and an outlet port of the same size, a flexible conduit having one end connected to said inlet port and the other end adapted to be connected to the pressure side of the fuel pump, a second flexible similar conduit having one end connected to said outlet port and the other end adapted to be connected to the carburetor in the fuel system, means for closing the passageway through one of said conduits, a pressure gauge on said housing, a test receptacle for fuel, said receptacle formed of transparent material and having markings on its face, a tube extending into said receptacle and terminating a spaced distance from the bottom of said receptacle, a bottom closure for said tube, a cap removably mounted on said receptacle, said tube extending through said cap, supporting means for said tube carried by said cap, a spring element included in said supporting means, whereby said tube may be thrust downwardly a limited distance against the force of said spring, said housing mounted on the upper end of said tube above said cap, a valve at the upper end of said tube controlling the passage of fuel from said housing through said tube into said receptacle, a seat for said valve, a valve rod for said valve extending down through said tube and through said bottom closure and slidable therein, said rod terminating adjacent the bottom of said receptacle, a spring element normally holding said valve closed, whereby downward movement of said tube with respect to said receptacle will result in the raising of said valve from said valve seat, a pair of outlet orifices of different size arranged at different levels in the lower portion of said tube, and a sleeve slidable on said tube and adapted to close either of said orifices selectively, the smaller of said orifices being sufficiently small in size to restrict the discharge of fuel into said receptacle from said tube and said housing when said valve is fully open.

References Cited in the file of this patent

UNITED STATES PATENTS

| | | |
|---|---|---|
| 2,062,173 | Haskins | Nov. 24, 1936 |
| 2,073,243 | Liddell et al. | Mar. 9, 1937 |
| 2,098,677 | Saballus et al. | Nov. 9, 1937 |
| 2,566,742 | Odell | Sept. 4, 1951 |